No. 732,888. Patented July 7, 1903.

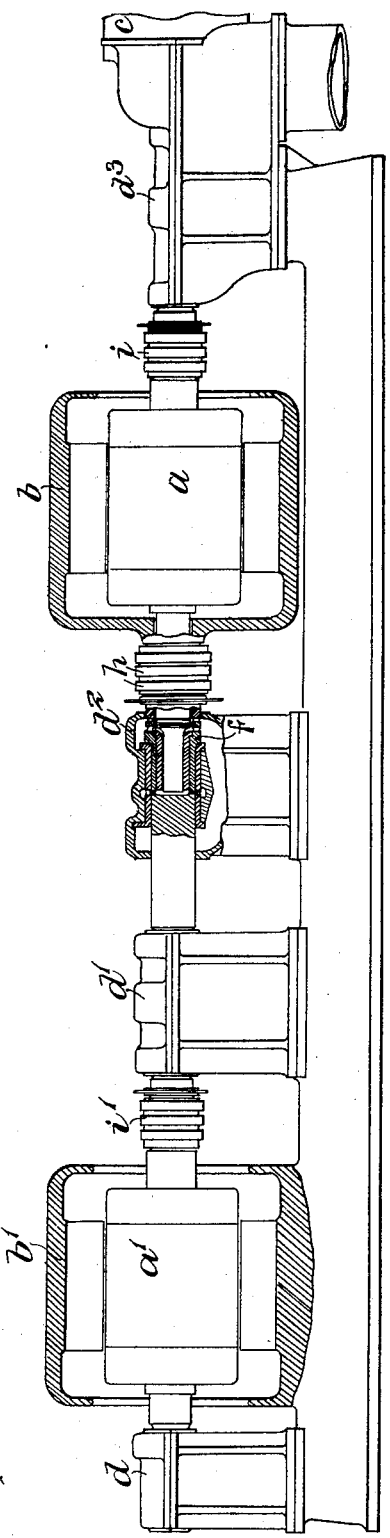

UNITED STATES PATENT OFFICE.

CHARLES ALGERNON PARSONS, OF NEWCASTLE-UPON-TYNE, ENGLAND.

ALTERNATOR.

SPECIFICATION forming part of Letters Patent No. 732,888, dated July 7, 1903.

Application filed October 6, 1902. Serial No. 126,246. (No model.)

*To all whom it may concern:*

Be it known that I, CHARLES ALGERNON PARSONS, a subject of the King of Great Britain and Ireland, residing at Heaton Works, Newcastle-upon-Tyne, in the county of Northumberland, England, have invented certain new and useful Improvements Relating to Alternators, (for which I have made application for Letters Patent in Great Britain bearing date March 19, 1902, No. 6,734,) of which the following is a specification.

My invention relates to alternators, more especially to those driven at high angular velocities, and has for its object to obtain a current of a lower frequency than has hitherto been possible. Such an alternator is of immense advantage for coupling to high-speed motors, such as steam-turbines.

I am able according to my invention to obtain current at a lower periodicity than can be obtained from a two-pole alternator of ordinary construction.

My invention consists in employing two or more rotating elements and one or more fixed elements combined differentially in such a way that their relative speeds of rotation give the requisite low frequency.

The accompanying drawing shows an elevation of one arrangement of my invention partly in section.

In carrying my invention into effect according to this arrangement when it is desired to obtain with an alternator having a given number of poles a periodicity of one-half that of an ordinary alternator I mount both the magnets $a$ and the armature $b$, forming the two rotating elements, on separate shafts, and I couple the motor $c$ to one of them—say the magnets—and allow the armature to rotate at half the velocity in the same direction. Again, on the shaft of the half-speed element or armature in this case I attach the magnet $a'$ of a second alternator, the armature $b'$ of this latter being fixed. Suitable bearings are shown at $d$ $d'$ $d^2$ $d^3$, that at $d^2$ preferably being of suitable form to take the weight of the magnets $a$, the shaft $e$ of which is prolonged and which revolves within the hollow shaft $f$ of the revolving armature $b$. The necessary slip-rings for collecting the current, which may be single or multi phase, are indicated at $h$, the magnets being excited by way of the rings $i$ $i'$.

From the first pair of elements—viz., the full and half speed pair or magnet $a$ and armature $b$—I obtain an alternating current of one-half the periodicity that would arise if one element were fixed. Again, for the second pair—viz., the half-speed and the fixed elements or magnet $a'$ and armature $b'$—I obtain a current of the same periodicity as that from the first pair of elements. In some cases I couple both these alternators in parallel and obtain the sum of the output of both these alternators at half the periodicity which would be obtained from the same angular velocity of motor if applied in a single alternator with the same number of poles.

It will be seen that if I draw off approximately the same watts from each alternator the horse-power absorbed by each will be approximately equal and that of the torque delivered by the motor one-half, approximately, will be delivered to the first and one-half to the second alternator. In this method of operating the iron and copper losses are similar in proportion to output to those incurred in ordinary alternators of similar construction running with half the angular speed of the motor. It is obvious also that instead of two three or more alternators may be similarly mounted and currents of correspondingly lower periodicity or periodicities or of several different periodicities derived from such combination.

It will be obvious that the poles may be either radially or axially disposed in relation to the armature.

Although for the purpose of clear description the magnets have been described as the fast-running elements, I wish it to be understood that in any pair of elements the positions of magnets and armature shown in the drawing may be interchanged.

Having now described my invention, what I claim as new, and desire to secure by Letters Patent, is—

1. In alternators driven by high-speed motors, means for obtaining a current of low frequency consisting in combination of a plurality of rotating alternator elements and one fixed alternator element combined differentially as regards speed.

2. An electric-current generator for obtaining a current of low frequency, consisting of the combination of a plurality of alternators, one element of one alternator being driven, the other element being in connection with one element of another alternator, the last element of all being stationary.

3. An electric-current generator for obtaining a current of low frequency consisting of the combination in parallel of a plurality of alternators one element of one alternator being driven, the other element being in connection with one element of another alternator, the last element of all being stationary.

4. An electric-current generator for obtaining a current of low frequency consisting of the combination of two alternators, one element of the first alternator being driven direct by a motor, the other element being coupled to one element of a second alternator, the other element of which is stationary.

5. An electric-current generator for obtaining a current of low frequency, consisting of the combination in parallel of two alternators, one element of the first alternator being driven direct by a motor, the other element being coupled to one element of a second alternator, the other element of which is stationary.

In witness whereof I have hereunto set my hand in presence of two witnesses.

CHARLES ALGERNON PARSONS.

Witnesses:
HENRY GRAHAM DALCYUS, Jr.,
WILLIAM DAGGETT.